(12) United States Patent
Powell et al.

(10) Patent No.: US 10,223,952 B2
(45) Date of Patent: Mar. 5, 2019

(54) CURVED EDGE DISPLAY WITH CONTROLLED DISTORTION

(71) Applicant: Microsoft Technology Licensing, LLC, Redmond, WA (US)

(72) Inventors: Karlton David Powell, Lake Stevens, WA (US); Ying Zheng, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 47 days.

(21) Appl. No.: 15/335,336

(22) Filed: Oct. 26, 2016

(65) Prior Publication Data

US 2018/0114474 A1  Apr. 26, 2018

(51) Int. Cl.
*G09G 3/36* (2006.01)
*G09G 3/02* (2006.01)
(Continued)

(52) U.S. Cl.
CPC ......... *G09G 3/02* (2013.01); *G02F 1/133526* (2013.01); *G02F 1/13336* (2013.01);
(Continued)

(58) Field of Classification Search
CPC ............... G09G 3/3208; G09G 3/2003; G09G 2320/0271; G09G 2320/0666; G09G 2320/0233
(Continued)

(56) References Cited

U.S. PATENT DOCUMENTS

| 5,894,359 A | 4/1999 | Suzuki et al. |
| 6,927,908 B2 | 8/2005 | Stark |

(Continued)

FOREIGN PATENT DOCUMENTS

| CN | 204480603 U | 7/2015 |
| KR | 20150033969 A | 4/2015 |

(Continued)

OTHER PUBLICATIONS

Arianpour, A. et al., "Enhanced signal coupling in wide-field fiber-coupled imagers", In Journal of Optics Express, vol. 23, Issue 4, Published Feb. 20, 2015, 15 pages.
(Continued)

*Primary Examiner* — Jennifer T Nguyen
(74) *Attorney, Agent, or Firm* — Alleman Hall Creasman & Tuttle LLP (57) ABSTRACT

An electronic display comprises a display matrix and an image-correcting layer. The display matrix includes a flat face portion, a curved corner portion, a light-releasing surface, and a series of pixels extending across the flat face portion and around the curved corner portion. Coupled to the light-releasing surface of the display matrix, the image-correcting layer is configured to transmit light released from the flat face portion of the display matrix and to reorient light released from the curved corner portion of the display matrix such that the transmitted light and the reoriented light exit the image-correcting layer substantially in parallel, forming an apparent plane image of the series of pixels.

18 Claims, 9 Drawing Sheets

(51) Int. Cl.
*G02F 1/1335* (2006.01)
*G09G 3/3208* (2016.01)
*G02F 1/1333* (2006.01)

(52) U.S. Cl.
CPC ..... *G09G 3/3208* (2013.01); *G09G 2300/026* (2013.01); *G09G 2310/0232* (2013.01); *G09G 2320/0233* (2013.01); *G09G 2380/02* (2013.01)

(58) Field of Classification Search
USPC .................................. 345/1.3, 169, 690, 87
See application file for complete search history.

(56) References Cited

U.S. PATENT DOCUMENTS

| | | |
|---|---|---|
| 7,310,050 B2 | 12/2007 | Yeh |
| 7,367,705 B2 | 5/2008 | McCollum et al. |
| 8,092,068 B2 | 1/2012 | Parker et al. |
| 8,339,526 B2 | 12/2012 | Minikey, Jr. et al. |
| 8,472,114 B2 | 6/2013 | Watanabe |
| 8,542,289 B1 | 9/2013 | McClatchie |
| 8,853,941 B2 | 10/2014 | Jung |
| 9,123,266 B2 | 9/2015 | Bastani et al. |
| 9,146,400 B1* | 9/2015 | Lee ................... G02B 3/0037 |
| 9,271,395 B2 | 2/2016 | Hongo et al. |
| 9,274,369 B1 | 3/2016 | Lee et al. |
| 9,568,800 B1* | 2/2017 | Sprague ................ G02F 1/167 |
| 2003/0055314 A1 | 3/2003 | Petillo et al. |
| 2004/0108806 A1 | 6/2004 | Cok et al. |
| 2006/0077544 A1 | 4/2006 | Stark |
| 2006/0251365 A1 | 11/2006 | Brewer |
| 2007/0103910 A1 | 5/2007 | Brickey et al. |
| 2007/0236939 A1 | 10/2007 | Ouderkirk et al. |
| 2008/0232751 A1 | 9/2008 | Tabor |
| 2009/0085831 A1 | 4/2009 | Odoi et al. |
| 2010/0141869 A1 | 6/2010 | Biemath et al. |
| 2011/0187966 A1 | 8/2011 | Yokota |
| 2011/0242686 A1* | 10/2011 | Watanabe .......... G02B 17/0884 359/804 |
| 2011/0255301 A1 | 10/2011 | Watanabe |
| 2012/0008340 A1 | 1/2012 | Tomotoshi et al. |
| 2012/0113614 A1* | 5/2012 | Watanabe .......... G02F 1/13336 361/810 |
| 2013/0271957 A1 | 10/2013 | Etienne et al. |
| 2013/0301263 A1 | 11/2013 | Yamanka |
| 2014/0037257 A1 | 2/2014 | Yang et al. |
| 2014/0071539 A1 | 3/2014 | Gao |
| 2014/0092283 A1 | 4/2014 | Yang et al. |
| 2014/0092346 A1 | 4/2014 | Yang et al. |
| 2014/0111974 A1 | 4/2014 | Choi et al. |
| 2014/0126183 A1 | 5/2014 | Geng et al. |
| 2014/0218956 A1 | 8/2014 | Wu |
| 2014/0320543 A1 | 10/2014 | Oh et al. |
| 2014/0346474 A1* | 11/2014 | Jeong ................. H01L 27/32 257/40 |
| 2014/0355227 A1 | 12/2014 | Lim |
| 2015/0001483 A1 | 1/2015 | Namkung et al. |
| 2015/0092442 A1 | 4/2015 | Wu |
| 2015/0093086 A1 | 4/2015 | Wu |
| 2015/0177561 A1* | 6/2015 | Yoshida ................ G09G 3/36 345/32 |
| 2015/0219831 A1 | 8/2015 | Tanaka |
| 2015/0346542 A1 | 12/2015 | An et al. |
| 2015/0370080 A1 | 12/2015 | Meacham |
| 2015/0378094 A1 | 12/2015 | Lu et al. |
| 2016/0071457 A1* | 3/2016 | Kim .................... G09G 3/2003 345/690 |
| 2016/0133169 A1 | 5/2016 | Park et al. |
| 2016/0196778 A1 | 7/2016 | Cha |
| 2016/0202726 A1 | 7/2016 | Seen et al. |
| 2016/0238785 A1* | 8/2016 | Park ................... G02B 6/0068 |
| 2017/0092703 A1* | 3/2017 | Bae .................... H01L 27/3232 |

FOREIGN PATENT DOCUMENTS

| | | |
|---|---|---|
| WO | 2008014761 A1 | 2/2008 |
| WO | 2016064595 A1 | 4/2016 |

OTHER PUBLICATIONS

Yan, J. et al., "Edge-Lighting Light Guide Plate Based on Micro-Prism for Liquid Crystal Display", In Journal of Display Technology, vol. 5, Issue 9, Sep. 2009, First published Aug. 7, 2009, 3 pages.

Lee, Hanjong, "Quad Edge Display: Accelerating the Evolution of Curved", Published on: Mar. 23, 2016 Available at: http://www.samsungsemiblog.com/displays/quad-edge-display-accelerating-the-evolution-of-curved-smartphones/.

<Kundan, et al., "Projection and Interaction with Ad-hoc Interfaces on Non-planar Surfaces", In Proceedings of 2nd International Conference on Advanced Computing, Networking and Security, Dec. 15, 2013, pp. 1-6.

"Universal Display's Borderless Flexible OLED Panel 'Best in Show' at SID Display Week", Industrial + Specialty Printing website, http://industrial-printing.net/content/universal-displays-borderless-flexible-oled-panel-best-show-sid-display-week#.Vz07ReJ94dV, May 30, 2013, 2 pages.

Vincent, J., "Chinese manufacturers are trying to kill the smartphone bezel", The Verge website, http://www.theverge.com/2015/3/25/8287663/smartphone-bezel-less-design-china, Mar. 25, 2015, 3 pages.

Lopez, N., "Dell brings its edgeless display to the powerhouse XPS 15", The Next Web website, http://thenextweb.com/gadgets/2015/10/08/dell-brings-its-edgeless-display-to-the-powerhouse-xps-15/#gref, Oct. 8, 2015, 4 pages.

Telegraph Reporters, "iPhone rumours: Apple to reinvent phone with edgeless display and no home button next year", The Telegraph website, http://www.telegraph.co.uk/technology/2016/05/12/iphone-rumours-apple-to-reinvent-phone-with-edgeless-display-and/, May 12, 2016, 11 pages.

"Non-Final Office Action Issued in U.S. Appl. No. 15/346,643", dated Aug. 24, 2017, 8 pages.

ISA European Patent Office, International Search Report and Written Opinion Issued in Application No. PCT/US2017/059137, dated Feb. 16, 2018, WIPO, 10 pages.

"Non-Final Office Action Issued in U.S. Appl. No. 15/421,303", dated Feb. 22, 2018, 11 Pages.

"Notice of Allowance Issued in U.S. Appl. No. 15/346,643", dated Mar. 26, 2018, 5 pages.

"Final Office Action Issued In U.S. Appl. No. 15/421,303", dated Jun. 29, 2018, 13 Pages.

* cited by examiner

CURVED EDGE DISPLAY WITH CONTROLLED DISTORTION

BACKGROUND

Electronic display technology has undergone rapid growth in recent years. Displays have become larger, flatter, brighter, more efficient, and capable of true-to-life color at high resolution. On the other hand, display technology does not currently leverage the advantages of modular design, which is enjoyed in other technological areas.

SUMMARY

One implementation provides an electronic display comprising a display matrix and an image-correcting layer. The display matrix includes a flat face portion, a curved corner portion, a light-releasing surface, and a series of pixels extending across the flat face portion and around the curved corner portion. Coupled to the light-releasing surface of the display matrix, the image-correcting layer is configured to transmit light released from the flat face portion of the display matrix and to reorient light released from the curved corner portion of the display matrix such that the transmitted light and the reoriented light exit the image-correcting layer substantially in parallel, forming an apparent plane image of the series of pixels.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Figure 1:
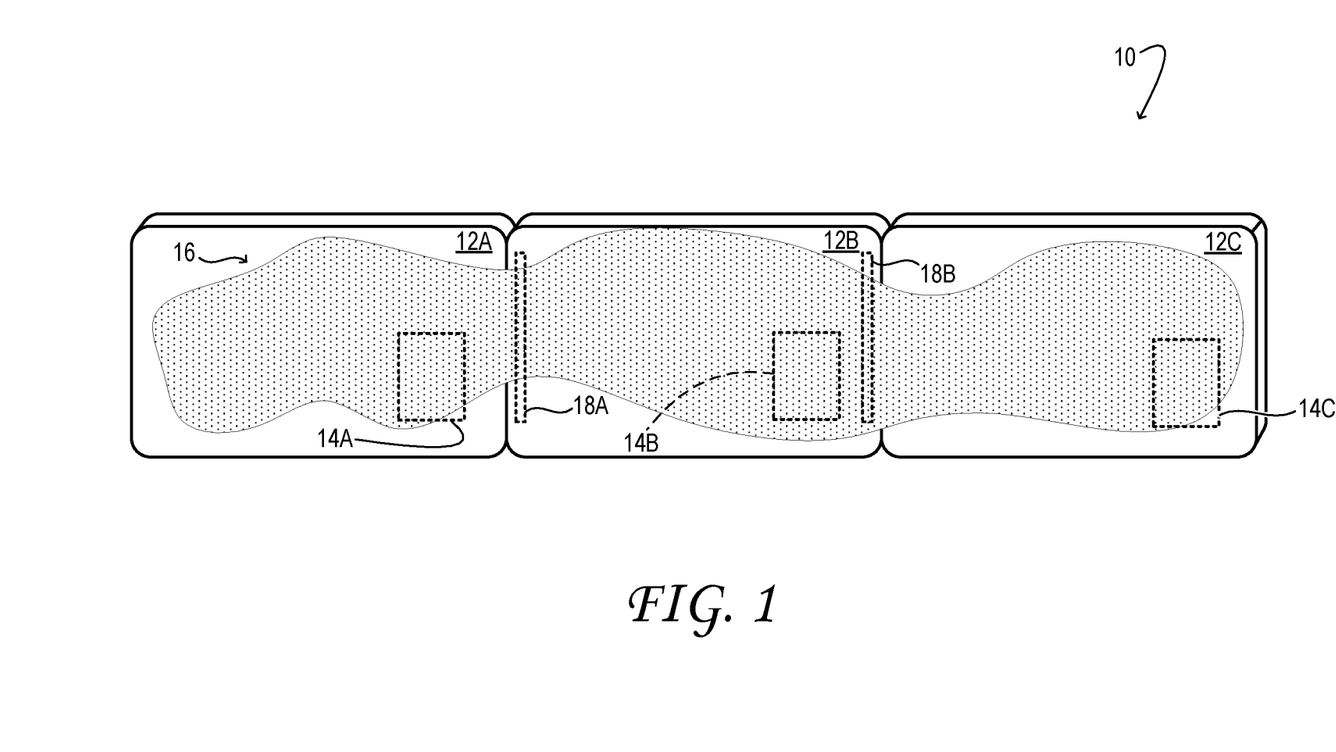
FIG. 1 shows aspects of an example modular electronic display system.

FIG. 1 shows aspects of an electronic display system 10 in one example implementation. Display system 10 includes a plurality of abutting, borderless display modules 12 (12A, 12B, 12C, specifically) having at least one computer 14 (e.g., 14A, 14B, and/or 14C). The computer communicates with each of the borderless display modules and is configured to supply image data thereto. The computer may include one or more processors, such as a graphics processor, and associated electronic memory. More specifically, the computer may be configured to render image data for a display image 16 to be cooperatively presented on the display system, such that the display image extends across the plurality of display modules. The image data may be comprised of a plurality of image-data components, each encoding the portion of the display image to be presented on a corresponding display module. The computer may be further configured to convey each of the image-data components to its respective display module, so that a continuous, unbroken display image may be presented on the display system. The mode of conveyance of the image-data components may be wired or wireless. In the implementation of FIG. 1, each of the display modules is observed in a landscape orientation and situated for horizontal abutment. Arranged in this manner, the display system presents a wide, panoramic display image. In other implementations, each of the display modules may be observed in a portrait orientation, to accommodate display images of lower aspect ratios.

In some implementations, at least one of the display modules 12 may include an abutment sensor 18 (e.g., 18A and/or 18B in FIG. 1) configured to identify abutting display modules. Output from the abutment sensor or sensors may be conveyed to computer 14B, so that the computer knows the geometric relationship of one display module relative to another, and is therefore able to map each image-data component to the corresponding display module. In some implementations, some functionality of the computer 14 (e.g., 14B) may be distributed to other computers 14 (e.g., 14A and/or 14C) of display system 10.

To facilitate a modular display system, such as display system 10, each display module 12 may be borderless—viz., capable of presenting display content all the way to the edge. However, a borderless display may be subject to manufacturing constraints associated with the display matrix used to present the image content. Some of these constraints are discussed below, with reference to FIGS. 2A, 2B, and 2C.

Figure 2A:
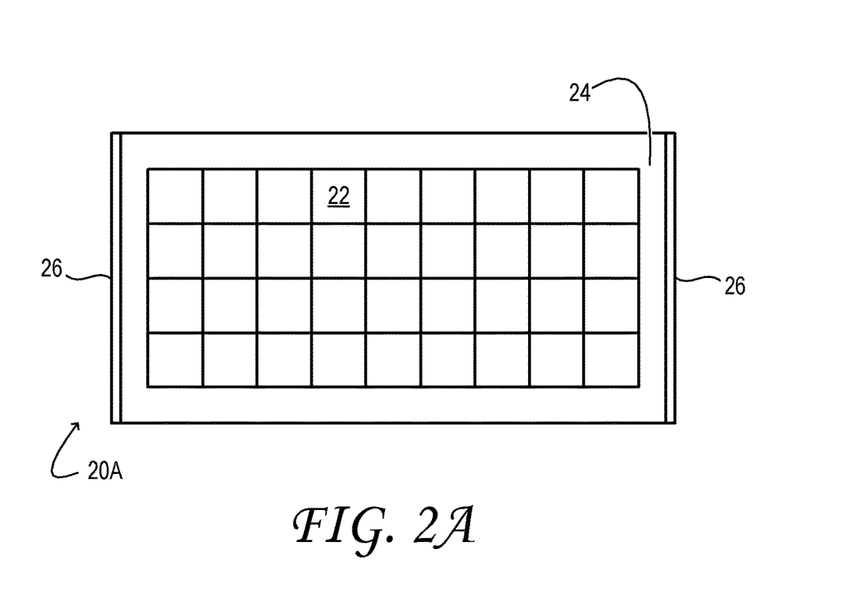
FIGS. 2A, 2B, and 2C show aspects of an example display matrix of an electronic display module.

FIG. 2A shows aspects of a display matrix 20A in schematic detail. The display matrix includes a plurality of pixels 22 bordered by an inactive edge 24. The inactive edge of the display matrix adjoins a sealing or supporting structure 26. The sealing or supporting structure may be configured to protect the internal componentry of the display matrix, to provide electrical connection for addressing the pixels, or to secure the display matrix to a chassis, for example. Naturally, if display matrix 20A were to lie flat in operation, there would be an inactive border area surrounding the active area of the display; lying flat, display matrix 20 could not be used in a borderless display module.

Figure 2B:
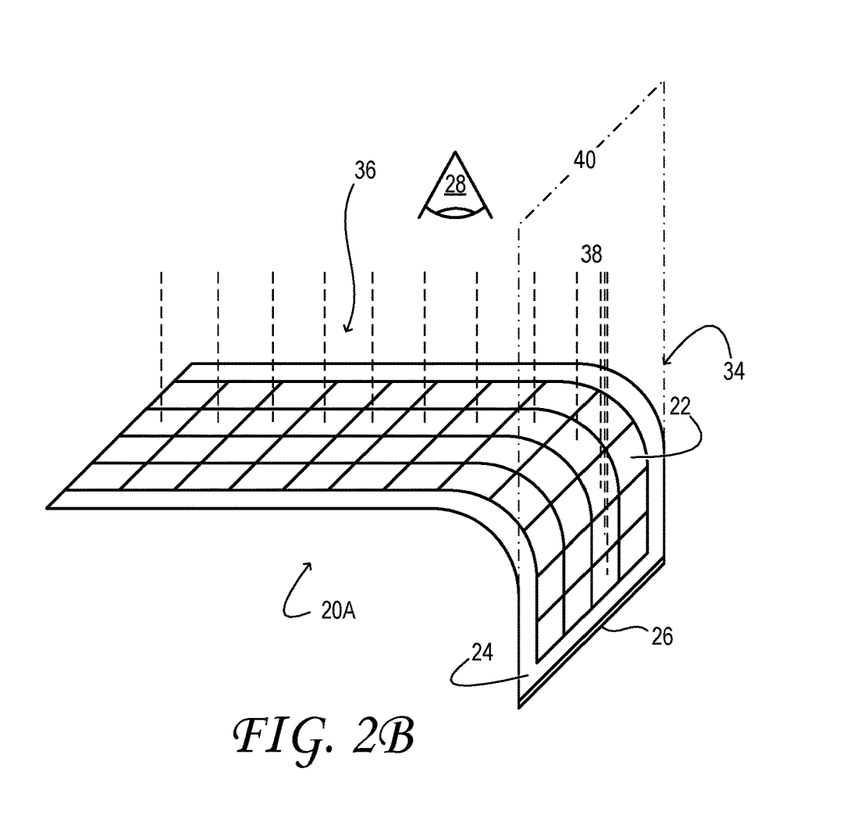
Figure 2C:
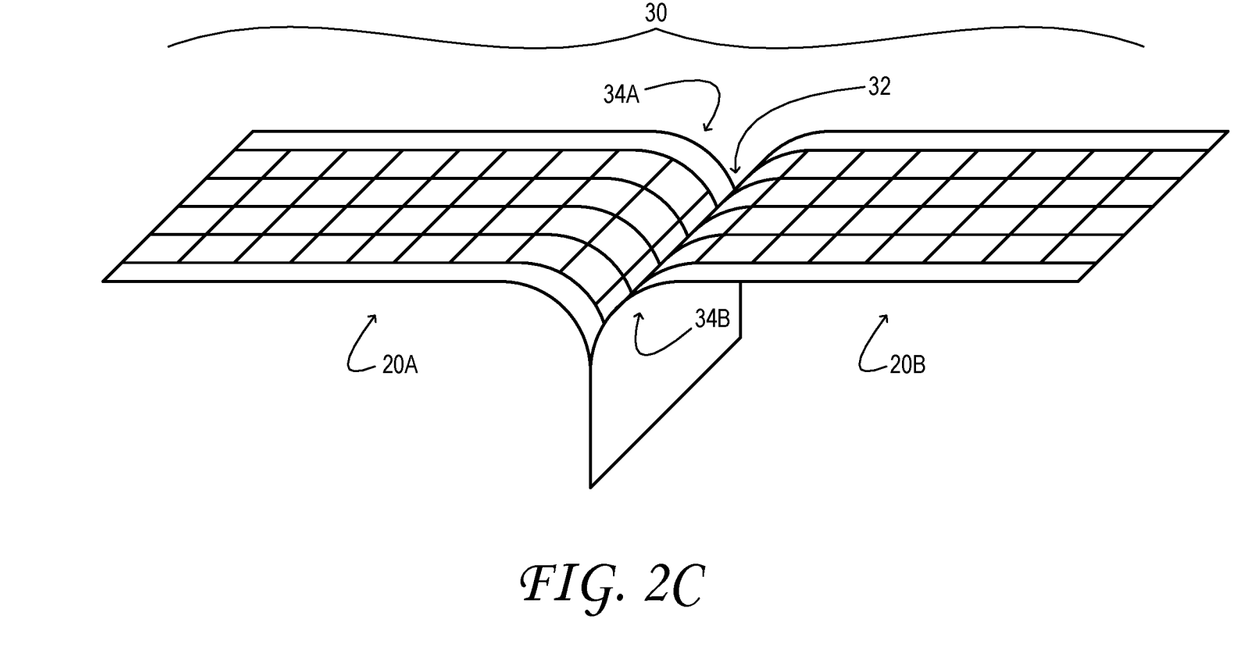

In FIG. 2B, however, the region adjacent inactive edge 24 is curved away from observer 28. In this configuration, display matrix 20A could be used in a borderless display module, because the inactive edge and adjoining sealing or supporting structure 26 are hidden from the observer's sight. As shown in FIG. 2C, a second, abutting display matrix 20B may now be added, to provide a continuous, unbroken display area 30 for display of a continuous, unbroken display image.

Even though display area 30 of FIG. 2C is continuous and unbroken, it may exhibit severe image distortion along and adjacent the shared edge 32 between curved edge regions 34 (34A, 34B) of abutting display modules 20A and 20B. Likewise, either of the display modules, when observed separately, would exhibit distortion at the curved edge regions. This issue is easily apparent from the view of FIG. 2B. Distortion occurs because observer 28 cannot sight a plane image of the series of pixels extending across flat face portion 36 and around curved corner portion 34 of the display matrix. Rather, the pixels of the curved corner portion are bent below the plane of the flat face portion (the image plane of the observer). The geometric projection of these pixels parallel to the observer's line of sight will exhibit compression 38, therefore, at the curved edge region.

Further, a gap may be required between adjacent display modules, in order to add a protective cover glass (glass or polymer) for protecting the display modules. Finally, even if a constant-thickness, curved cover glass is used, this still may result in significant distortion, along with uniformity roll-off and coloration. These issues may be expected because the refracted angles in the cover-glass media that correspond to view angles at the viewer position may be high relative to the display-surface normal.

Set forth in this disclosure are approaches to correct the observed image of pixels 22 located in the curved corner portion 34 of a display matrix 20, so that the pixel pitch appears uniform all the way to apparent edge 40 (the limit viewable by the observer). Based on borderless display modules 12 engineered as described herein, an effectively seamless modular electronic display system 10 can be constructed.

Figure 3:
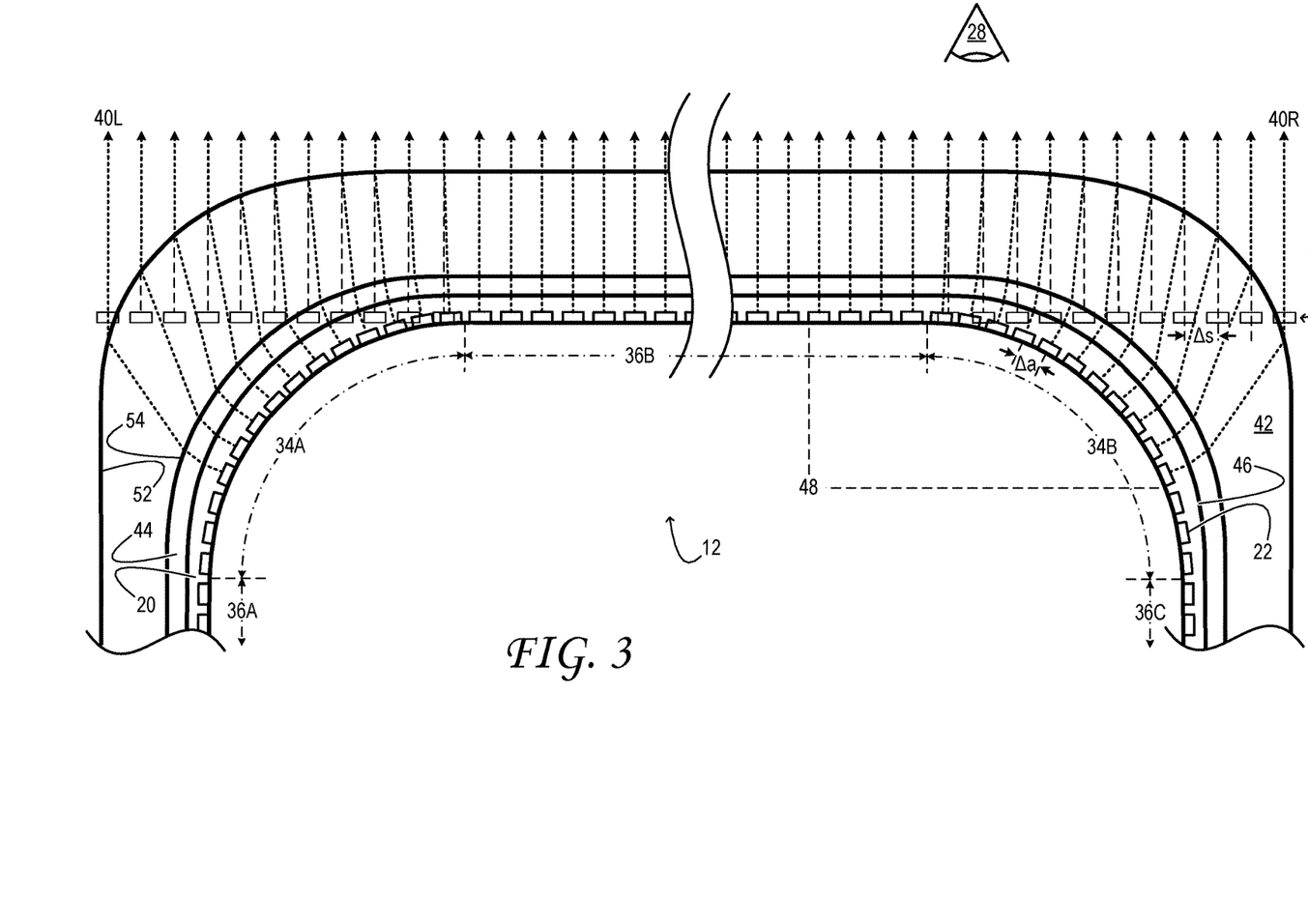
FIG. 3 shows aspects of an example electronic display module.

FIG. 3 schematically shows aspects of an example electronic display module 12 in cross section. The electronic display module includes display matrix 20, image-correcting layer 42, and an optional luminance-correcting layer 44.

Display matrix 20 includes curved corner portions 34A and 34B. The display matrix also includes a flat face portion 36B between curved corner portions 34A and 34B, and flat face portions 36A and 36C, which are substantially perpendicular to flat face portion 36B on the other sides of curved corner portions 34A and 34B, respectively. The display matrix presents a light-releasing surface 46 with pixels 22 arranged below the light-releasing surface. An example pixel series 48 (identified for purposes of illustration) extends across flat face portion 36B and around curved corner portion 34B. It will be noted that this series of pixels may be viewable through curved corner portion 34B, flat face portion 36B, and/or flat face portion 36C, depending on the disposition of observer 28 relative to display module 12. Accordingly, display matrix 20 can be used in a display module viewable from the side as well as the top. While only a small number of pixels are illustrated in FIG. 3, it is to be understood that this description is compatible with any display resolution.

Display matrix 20 may incorporate any suitable display technology, but must be capable of curvature. In some but not all implementations, to facilitate curvature, the display matrix may be flexible and/or bendable. As such, the display matrix may comprise an organic light-emitting diode (OLED) matrix. In the OLED art, a 'bendable' matrix typically supports a radius of curvature down to 3 millimeters (mm), while a 'flexible' matrix typically supports a radius of curvature down to 1 mm. Both bendable and flexible display matrices are compatible with this disclosure. In some implementations, each curved corner portion 34 of display matrix 20 admits of a cylindrical curvature, with a radius of the cylindrical curvature being 1 to 5 millimeters, or 3 to 5 millimeters in some examples, while other radii of curvature are also envisaged. In other implementations, the curvature may be non-cylindrical. The display matrix may have a thickness of about 300 microns in one, non-limiting implementation. The optical emitting layer for an OLED display matrix may typically be on the order of one-half the total thickness (e.g., 150 microns beneath surface of the display matrix). The thickness profile and refractive index of image correcting layer 42 (vide infra) accounts for the portion of the optical path between pixels 22 and light-releasing surface 46. Continuing in FIG. 3, image-correcting layer 42 is coupled to light-releasing surface 46 of display matrix 20. The image-correcting layer is configured to transmit light released from flat face portion 36B of the display matrix (at or near the surface normal) and to reorient light released from curved corner portion 34B such that the transmitted light and the reoriented light exit the image-correcting layer substantially in parallel, forming an apparent plane image 50 of pixel series 48. The term 'apparent plane image' is used because the pixels of the curved corner portion do not form a real image per se (as the pixels of the flat face portion do). The skilled reader will note that the optical path to the observer from pixels of the curved corner region is longer than the optical path from pixels in the flat face portion. However, the pixels of the curved corner portion do appear to emanate from correct angle within viewer's field of view (FOV), such that the entire series of pixels appears as a continuous image along the plane of observation. Likewise, the term 'substantially in parallel' reminds the reader that minor deviations from rigorously parallel emergence will compromise the efficacy of this approach to only a minor degree. In some implementations, the emerging rays may deviate by one degree or less. In other implementations, the emerging rays may deviate by one-half a degree or less. The term 'substantially in parallel' encompasses deviations within these ranges.

In this implementation, the apparent plane image is parallel to the flat face portion of the display matrix. Further, the linear spacing $\Delta S$ between the pixels in the image is functionally related to the along-the-arc spacing $\Delta A$ of the pixels in series 48, with $\Delta S = c \times \Delta A$. The parameter c may be any desired function of distance along the light-releasing surface. In one, non-limiting example, the spacing between the pixels in the image is equal to the spacing between the pixels of the series. In other words, the parameter c may be equal to one across the entire pixel series 48. This configuration provides, at normal (i.e., perpendicular to the plane) observation, zero distortion in the display image all the way to apparent edge 40R. In other implementations, the spacing between the pixels in the image may be approximately equal to the spacing between the pixels of the series—to within 10% or 5%, for example.

In the implementation of FIG. 3, image-correcting layer 42 is a refractive optic—i.e., a lens. In some implementations, the image-correcting layer is comprised of hardened glass. In other implementations, the image-correcting layer may be comprised of a transparent polymer, such as acrylic or polycarbonate, and may include a hard coating. Here, the thickness of the image-correcting layer is constant in a region arranged over flat face portion 36B of display matrix 20 and continuously varied in a region arranged over curved corner portion 34B of the display matrix. More specifically, the thickness of the image-correcting layer, as a function of distance along light-releasing surface 46, is controlled such that the transmitted light and the reoriented light exit the image-correcting layer in parallel, forming the apparent plane image 50 of the pixel series 48.

Figure 4A:
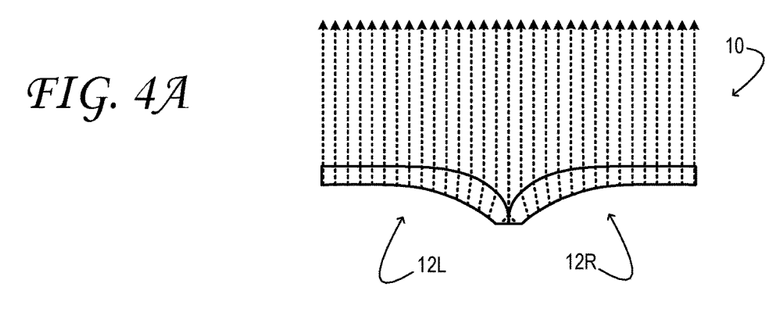
FIGS. 4A, 4B, and 4C show aspects of an example modular display system as viewed from three different observation angles.
Figure 4B:
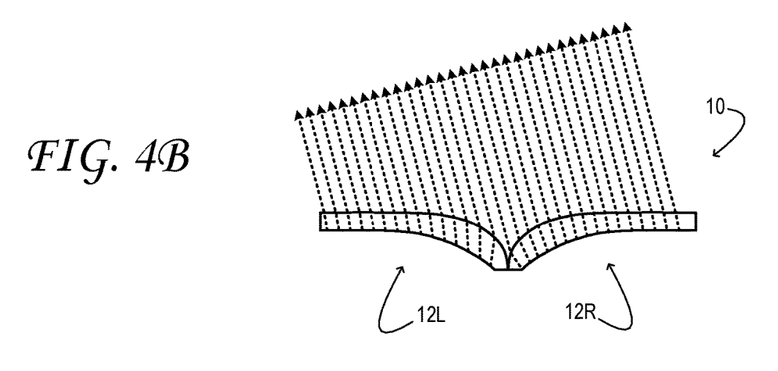
Figure 4C:
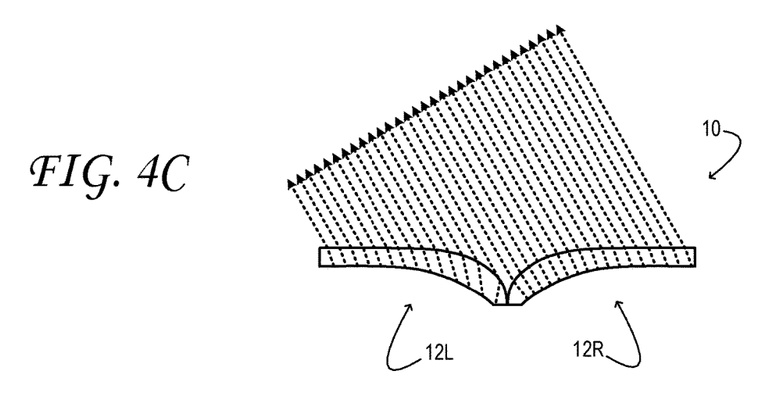

A display module 12 having an image-correcting layer 42 may be incorporated into a modular display system 10, as described above. FIGS. 4A, 4B, and 4C illustrate a modular system comprising a right display module 12R and a left display module 12L as viewed from three different observation angles. In FIG. 4A, the display system is observed from the normal angle. In FIGS. 4B and 4C, the display system is observed from 15 and 30°, respectively, from the normal angle. In these examples, an apparent plane image of pixels spans both the right and the left display modules.

Figure 5A:
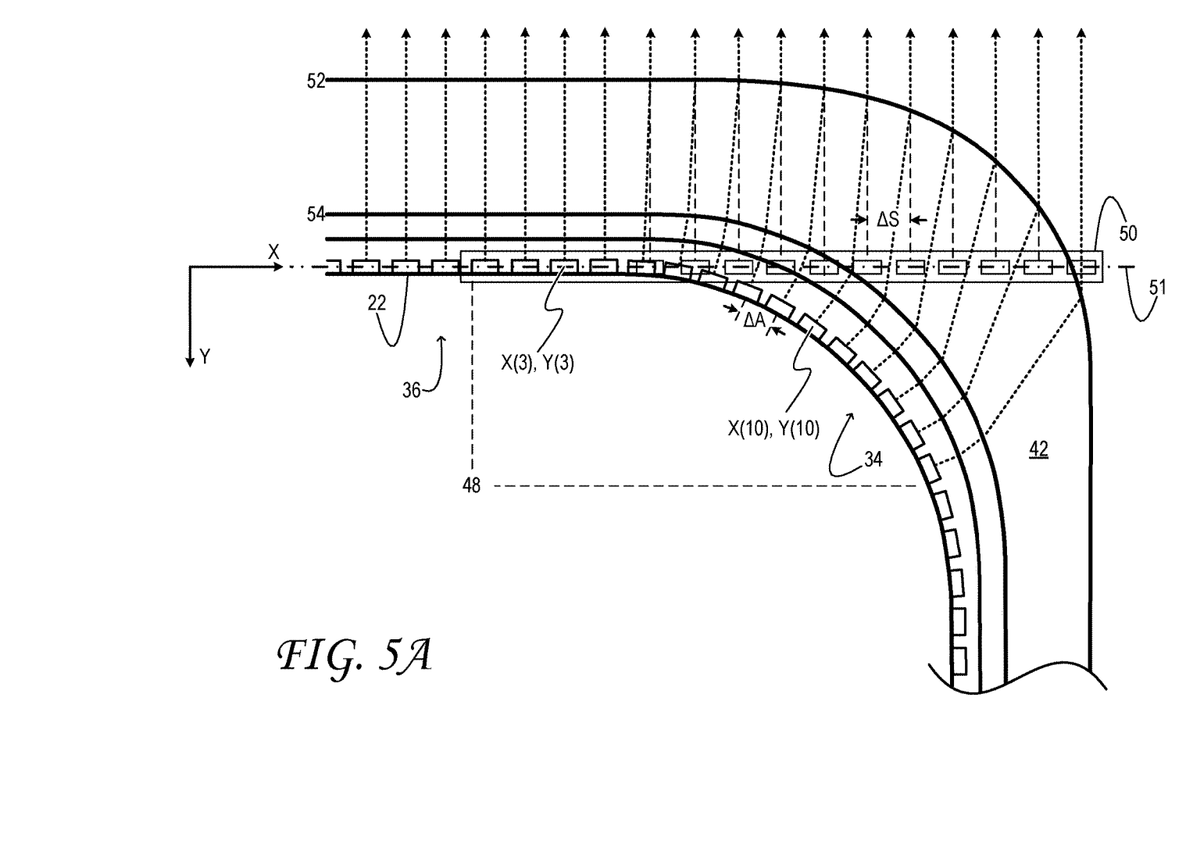
FIGS. 5A, 5B, and 5C show aspects of an example image-correcting layer of an electronic display module.

Ray tracing may be used to determine an appropriate thickness profile of image-correcting layer 42, to satisfy the conditions above. The partial cross-sectional views of FIGS. 5A, 5B, and 5B further illustrate the ray-tracing. In some cases, the curvature desired for display matrix 20 is an initial constraint. Turning first to FIG. 5A, the curvature may be expressed as a pair of parametric functions X(i), Y(i), where the parameter i is the number of the pixel in a given series of pixels, X is the horizontal position of the pixel, and Y is the displacement of the pixel below the horizontal plane 51 of the pixels of flat face portion 36. Once the curvature of the display matrix is established, the image-correcting layer profile is determined by tracing a ray from each pixel in a direction normal to that pixel, and may depend on the refractive index and thickness of various layers in between pixels and the exit surface of the image correcting layer, such as the top display layer above the emitting pixel layer, any optical bond layers, and the optional luminance correcting layer 44 (vide infra). In a closed-loop manner, the image-correcting layer is set to the appropriate thickness so that the traced ray exits the image-correcting layer normal to the flat face portion 36 of the display matrix. This optical condition will make the image of every pixel in the series appear to lie on horizontal plane 51, from the point of view of the observer. In implementations in which the image-correcting layer is a bulk refractor, the ray-tracing procedure invokes Snell's Law at exit surface 52 of the image-correcting layer. In implementations in which the refractive index changes at entry surface 54, the ray-tracing procedure may also invoke Snell's Law at the entry surface.

Figure 5B:
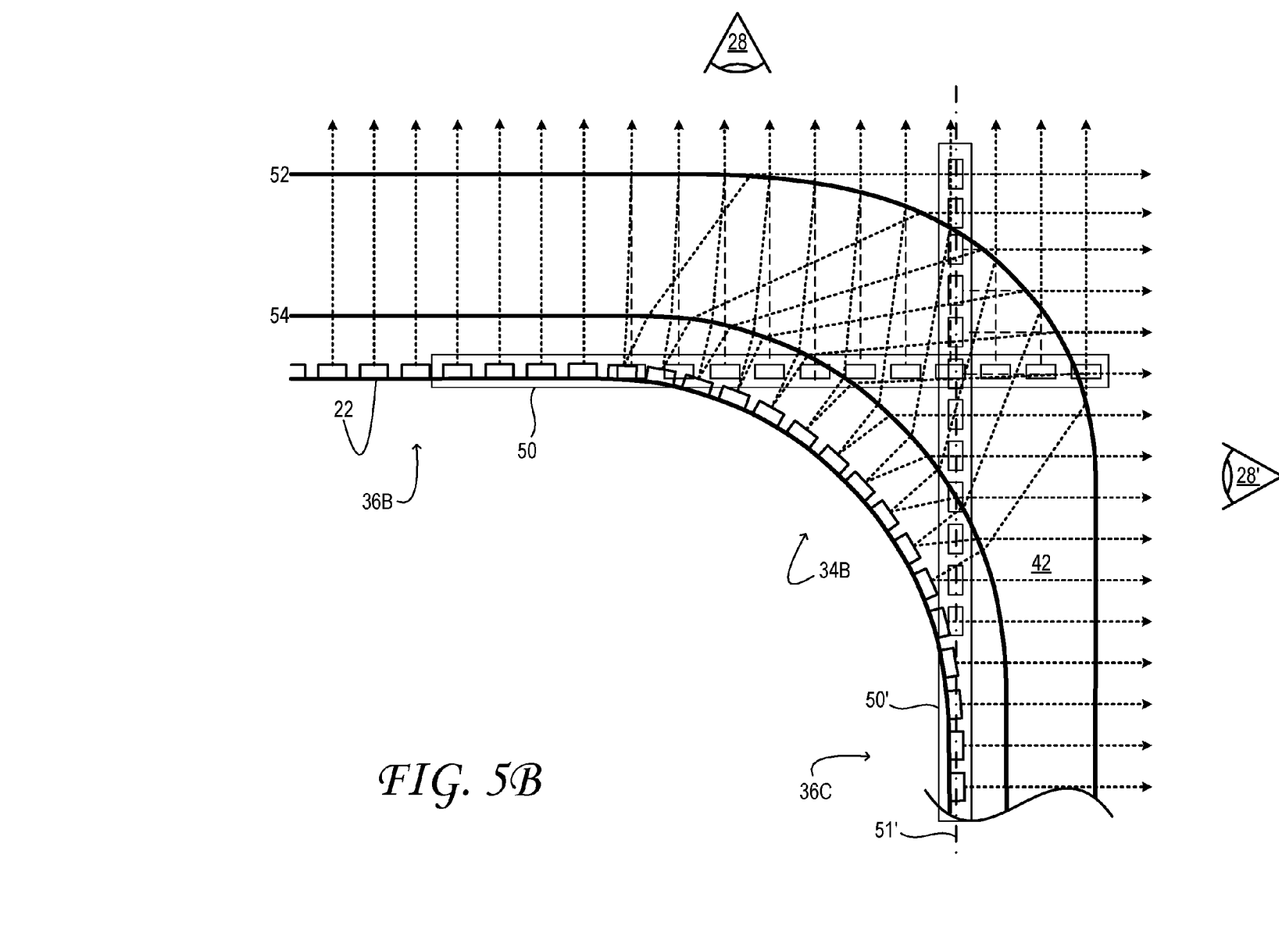
Figure 5C:
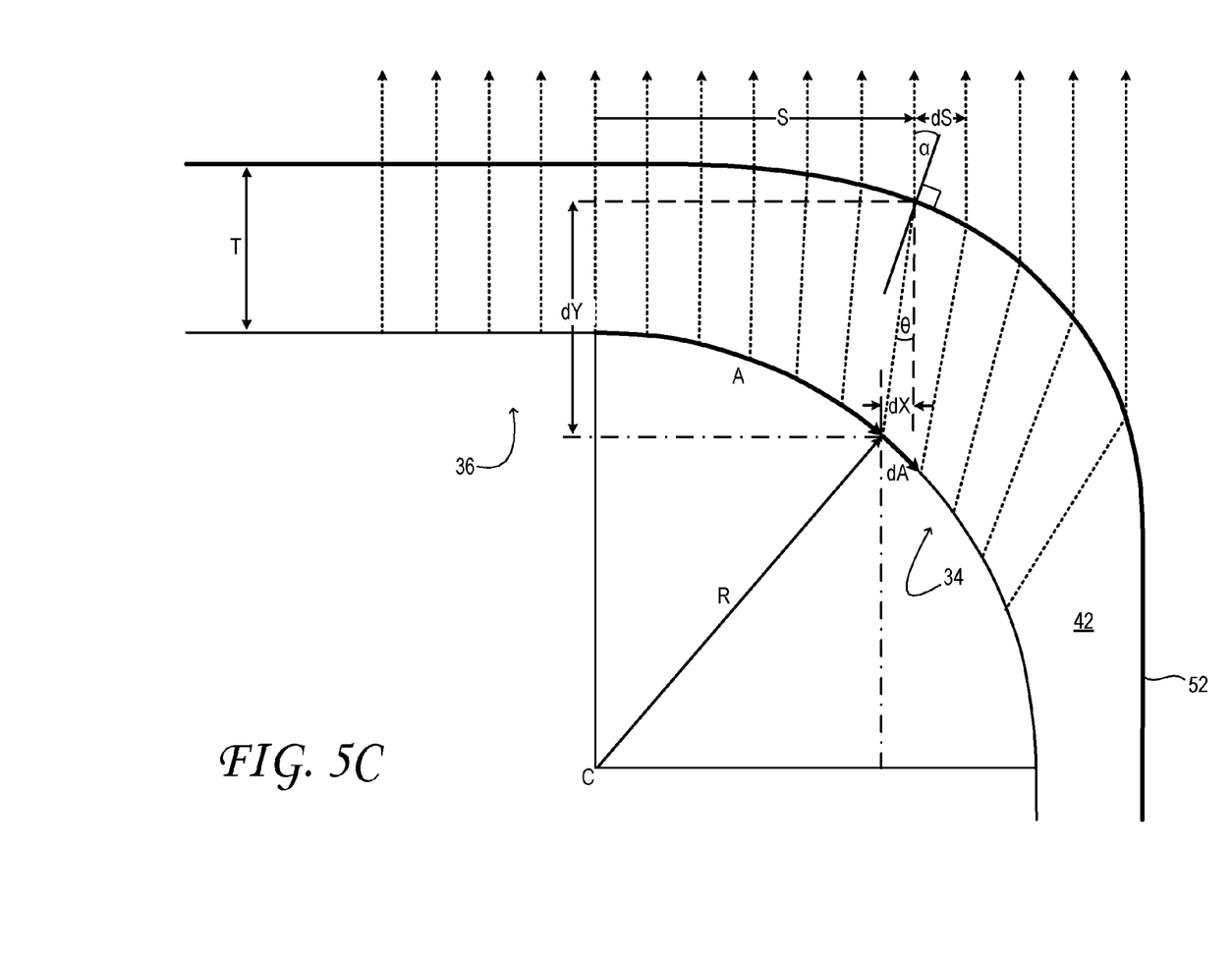

As shown in the ray-tracing diagram of FIG. 5B, image-correcting layer 42 may be configured to reduce distortion on viewing display matrix 20 from the front (i.e., normal to flat face portion 36B) and simultaneously to reduce distortion on viewing the display matrix from the side (i.e., normal to flat face portion 36C). In the example illustrated in FIG. 5B, the image-correcting layer forms an apparent plane image 50' visible to the side observer 28' as well as the apparent image plane 50 visible to the front observer 28. Apparent plane image 50' is aligned to observation plane 51', which is the plane of the pixels in flat face portion 36C.

An efficient application of ray tracing to compute the thickness profile of image-correcting layer 42 is summarized below, with reference now to FIG. 5B.

In the diagram of FIG. 5B, the parameter S represents horizontal distance across image-correcting layer 42 right of the center of curvature C of curved corner portion 34. The parameter A represents distance clockwise along the curved arc of the pixels of the display matrix. Iteration is begun with input of an appropriate initial thickness T of image-correcting layer 42 above flat face portion 36 of display matrix 20, and input of the radius of curvature R. At each step of the iteration, A is incremented by an appropriate dA, and S is incremented by dS=c×dA. This condition provides the desired geometric mapping between actual and imaged pixel positions. Every point on the curved arc of the pixels is joined to a corresponding point on exit surface 52 by a ray that propagates through the image-correcting layer. This ray propagates at an angle θ relative to the desired exit direction, which is normal to the flat face portion. The value of θ is determined trigonometrically, based on the increments dA and dS. As shown in FIG. 5B, α is the angle of the normal of exit surface 52 relative to the desired exit direction. Snell's Law relates α and θ. For efficiency of computation, a look-up table pairing α and θ based on Snell's Law is populated at the outset of the iteration. Using the look-up table, α is determined based on θ at each step of the iteration, and the value of the thickness T is updated based on α: T=T−dS tan(α). The process then loops back to compute a new value of the angle θ based on updated values of S and T.

Distortion in the display image is eliminated only when the c parameter equals one for the entire series of pixels of a curved corner portion. This requires a constrained thickness profile that may or may not be consistent with the desired aesthetic of display module 12 or with manufacturing constraints. In some scenarios, therefore, it may be desirable to strike a compromise between image correction and aesthetic and/or manufacturing constraints by tolerating a small and controlled amount of distortion over the curved corner portion. This is accomplished by setting the parameter c to a non-unit value or by varying c as a function of distance across the display matrix (S in FIG. 5B), which may be a linear or nonlinear function of distance, e.g., apparent pixel spacing or pixel position may vary with distance across as a gamma function. It should be noted that small changes having a low or imperceptible impact on distortion may be used to expand the edge for a given value of R, so as to enable control over target side thickness of the image-correcting layer, for mechanical or aesthetic purposes.

An image-correcting layer 42 having a thickness profile as described above may be hot-formed, ground and polished, in some implementations. In other implementations, the image-correcting layer may be formed using a constant-thickness, hot-formed cover glass and undermolding the radius in a first molding step, followed by optically clear adhesive (OCA) bonding display matrix 20 to the undermolded cover glass. Alternatively, a curved, constant-thickness cover glass may be placed over the display matrix, and the curved corner gap may be filled with an optically clear resin.

In the approach outlined above, the refractive index of image-correcting layer 42 is assumed to be constant. This condition is not necessary, however, as controlled variation of the refractive index of the image-correcting layer may be used to change the thickness profile, for reasons described above in the context of using a non-unit c parameter. Accordingly, the refractive index of the image-correcting layer may be constant in a region arranged over a flat face portion 36 of the display matrix and continuously varied in a region arranged over a curved corner portion 34 of display matrix 20. More specifically, each of a thickness and a refractive index of the image-correcting layer, as functions of distance along light-releasing surface 46, may be controlled such that the transmitted light and the reoriented light exit the image-correcting layer in parallel, forming an apparent plane image 50 of the pixel series 48.

Returning now to FIG. 3, in display module 12, luminance-correcting layer 44 is arranged between display matrix 20 and image-correcting layer 42. The luminance-correcting layer optically couples light from the display matrix into the image-correcting layer. More specifically, the luminance-correcting layer is configured to deflect the light released from curved corner portion 34B into an acceptance cone (or other acceptance profile) of the image-correcting layer. The luminance-correcting layer is desirable in some implementations because light emission from the various pixels 22 of an OLED matrix may be less than Lambertian, e.g., having angular exit intensity profile with a full-width at half-maximum (FWHM) on order of 82°. This means that the peak of the emission is directed at low angles relative to the surface normal of the display matrix. In curved edge region 34B, therefore, the peak luminance, and thus a substantial portion of angularly emitted light energy, from the pixel array may be unavailable for refraction at the desired exit angle without use of a luminance-correcting layer. In some implementations, the luminance-correcting layer is a prismatic layer having a periodic array of prismatic facets arranged in a lower-index medium, or a higher index medium, so as to utilize differential index to achieve the redirection of peak luminance light into acceptance of the image correcting layer, as well as redirect other angles of emitted light. The prismatic facets cooperate in a Fresnel sense to bend the emitted light into the acceptance profile of the image-correcting layer. In other implementations, the luminance-correcting layer may include a holographic layer including three or more holograms configured to redirect the emitted light into the acceptance profile of the image-correcting layer. Volume holograms excited individually by red, green, and blue light may be especially useful for this purpose.

Figure 6:
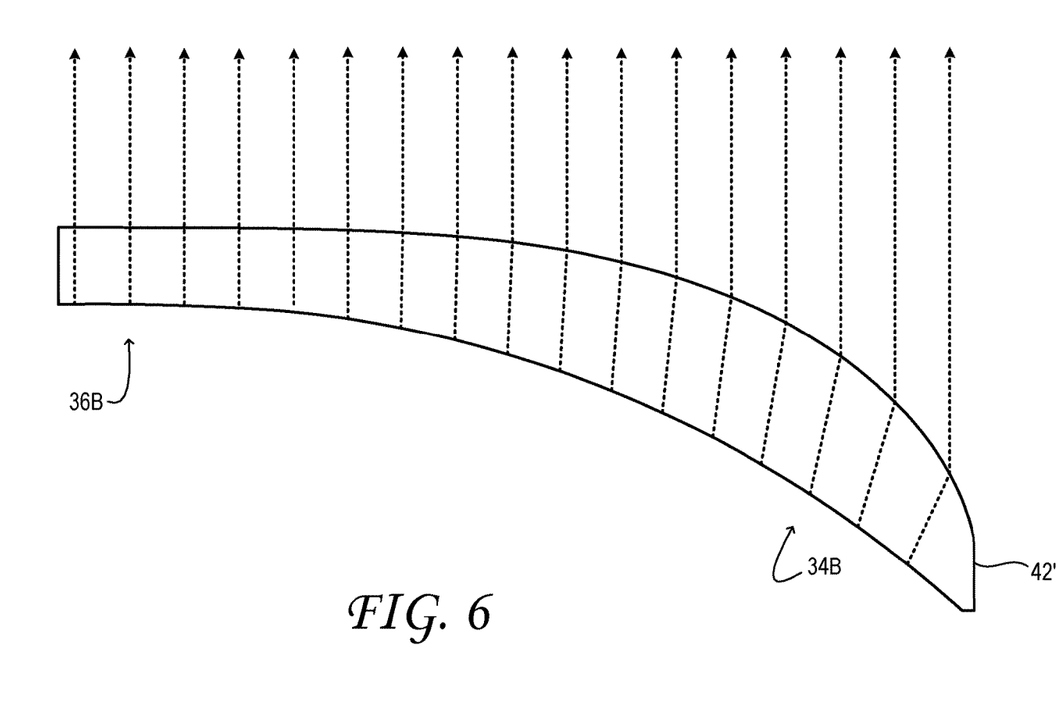
FIG. 6 shows aspects of another example image-correcting layer of an electronic display module.

No aspect of the foregoing drawings or description should be interpreted in a limiting sense, for numerous variations, extensions, and omissions are also envisaged. Luminance-correcting layer 44, for example, may not be necessary in every implementation. One approach to reducing the roll-off in luminance for a given radius of curvature is to utilize less than the full 90° arc length in the curved corner portion. This approach is illustrated in FIG. 6. This configuration may enable the display to appear similar to the binder seam of an open book—a desirable effect in some scenarios. Utilizing an arc length less than 90°, a pair of abutting display modules 12 meeting at a darkened edge 24 may provide a desirable book-like aesthetic.

Furthermore, if the display content is reflective (e.g., printed matter on substrate or comprising e-ink on e-paper), ambient light may serve as the illumination source, such that display appears reasonably uniform all the way to the edge. In still other implementations, the luminance uniformity roll-off may be addressed by electronically boosting the emitted output of the pixels within the curved corner portion. Here, the amount of increase in output luminance for each pixel may be adjusted so that the apparent plane image 50 of pixels may appear uniform in luminance all the way to the edge. In some cases, a correction profile of drive character may be utilized, e.g., having a non-linear ramp function from the beginning of the curved corner portion to the edge of the display. In some cases, a boost of as high as a factor of two may be utilized as part of the boosted correction driving profile of pixels within the curved corner portion, in order to achieve a prescribed uniformity of the pixels in apparent image plane to the edge. While one option is to lower the luminance in the flat face portion, such that the edge is boosted in a relative sense, overdriving the pixels in the curved corner portion enables the pixels of the flat face portion to provide a given minimum luminance for normal viewing. For instance, some OLED manufacturers provide a normal brightness and a high brightness mode, so one option is to use some of the high brightness range to boost the pixels of the curved corner portion so that the display device achieves uniformity for normal viewing.

As noted above, image-correcting layer 42 may enable display content to be presented all the way to edge of display module 12, for a truly borderless display. This usage scenario is not strictly necessary, however. For instance, the image-correcting layer may also be used to achieve close-to-edge display presentation, such as in cases where a geometric tuck around the curved edge hides some but not all of the black border of a display module. In general, the desired approach of the display content to the edge could be a parameter to be adjusted as desired, depending on target thickness, radius of curvature, and width of the inactive edge 24 of display matrix 20 (which may be 0.6 to 0.85 millimeters for some OLED displays). In other words, the image-correcting layer may support a borderless display system, however the scale of a particular display and finite border width may reveal cases where low distortion is achieved, but with an apparent black border, due to finite black border width. Further, while modular operation of electronic display module 12 is indeed contemplated, it is not always necessary. A borderless electronic display exhibiting low distortion all the way to the viewable edge 24 is useful even when used by itself. To emphasize this fact, electronic display module 12 can also be referred to as a 'electronic display', with no loss of generality.

Although image-correcting layer 42 is refractive in the above implementations, even this feature is not strictly necessary. In other implementations, the image-correcting layer may include one or more prismatic and/or holographic films, similar to the films described in the context of luminance-correcting layer 44. In other words, one prismatic and/or holographic film arranged at entry surface 54 of the image-correcting layer, and another at exit surface 52, may accomplish or assist in the reorientation of light from curved edge regions 42. Moreover, a prismatic and/or holographic film at entry surface 54 may be configured to achieve the combined effects of luminance and image correction.

In some scenarios, the solutions described above are sufficient, without any upstream correction of the image data, to reduce the optical distortion from display module 12 to acceptable levels. This does not imply, however, that the above solutions are exclusive of upstream image-data correction. Indeed, scenarios are envisaged in which an image-correcting layer 42 is used in combination with some upstream correction, for added benefit. In implementations in which aesthetic or manufacturing constraints do not permit a zero-distortion (c=1) image-correcting layer to be used, the image-correcting layer may be configured to provide a small amount of controlled distortion, which is nulled by upstream correction of the image data. One or more computers 14 of the display module or system may be used to effect the correction.

Finally, while image-correcting layer 42 is well-suited to correct image distortion from a curved, emissive (e.g., OLED) display, even that aspect is not strictly necessary. Indeed, the image-correcting layer as described herein may be used over a curved display matrix comprising e-ink on e-paper, which reflects and absorbs ambient light, and over curved printed media, such as ordinary paper. In these examples, a diffusely reflective front surface of the media may act as a surrogate for the emissive pixels noted above. In implementations where a display image is formed by controlling the reflection of light, light-releasing surface 46 may release light by reflection.

One aspect of this disclosure is directed to an electronic display comprising a display matrix including a series of pixels extending across a flat face portion and around a curved corner portion, and, an image-correcting layer coupled to a light-releasing surface of the display matrix. The image-correcting layer is configured to transmit light released from the flat face portion and to reorient light released from the curved corner portion such that the transmitted light and the reoriented light exit the image-correcting layer in parallel, forming an apparent plane image of the series of pixels.

In some implementations, the electronic display further comprises a luminance-correcting layer arranged between the display matrix and the image-correcting layer and configured to deflect the light released from the curved corner portion into an acceptance of the image-correcting layer. In some implementations, the display matrix includes a flexible organic light-emitting diode matrix. In some implementations, the image-correcting layer includes one or more prismatic and/or holographic films. In some implementations, the image-correcting layer includes a refractive optic. In some implementations, a thickness of the image-correcting layer is constant in a region arranged over the flat face portion of the display matrix and continuously varied in a region arranged over the curved corner portion of the display matrix. In some implementations, a refractive index of the image-correcting layer is constant in a region arranged over the flat face portion of the display matrix and continuously varied in a region arranged over the curved corner portion of the display matrix. In some implementations, each of a thickness and a refractive index of the image-correcting layer, as functions of distance along the light-releasing surface, are controlled such that the transmitted light and the reoriented light exit the image-correcting layer in parallel, forming the apparent plane image of the series of pixels. In some implementations, the apparent plane image is parallel to the flat face portion of the display matrix. In some implementations, a spacing $\Delta S$ between the pixels in the image is functionally related to a spacing $\Delta A$ of the pixels in the series, wherein $\Delta S = c \times \Delta A$, and wherein c is a function of distance along the light-releasing surface. In some implementations, the spacing between the pixels in the image is equal to the spacing between the pixels of the series. In some implementations, the curved corner portion admits of a cylindrical curvature, and a radius of the cylindrical curvature is one to five millimeters. In some implementations, the image-correcting layer is comprised of hardened glass. In some implementations, the electronic display further comprises a second flat face portion, wherein the curved corner portion is between the flat face portion and the second flat face portion, and wherein the series of pixels is viewable through both the flat face portion and the second flat face portion.

Another aspect of this disclosure is directed to a display comprising a light-releasing display surface extending across a flat face portion and around a curved corner portion; and an image-correcting layer coupled to the light-releasing display surface. The image-correcting layer is configured to transmit light released from the flat face portion and to reorient light released from the curved corner portion such that the transmitted light and the reoriented light exit the image-correcting layer in parallel, forming an apparent plane image of the flat face portion and the curved corner portion.

In some implementations, the electronic display further comprises a luminance-correcting layer arranged between the light-releasing display surface and the image-correcting layer, wherein the luminance-correcting layer is configured to deflect the light released from the curved corner portion into an acceptance profile of the image-correcting layer. In some implementations, the luminance-correcting layer includes a prismatic layer. In some implementations, the luminance-correcting layer includes a holographic layer.

Another aspect of this disclosure is directed to an electronic display system comprising a borderless display module, itself comprising a display matrix including a series of pixels extending across a flat face portion and around a curved corner portion; and an image-correcting layer coupled to a light-releasing surface of the display matrix. The image-correcting layer is configured to transmit light released from the flat face portion and to reorient light released from the curved corner portion such that the transmitted light and the reoriented light exit the image-correcting layer in parallel, forming an apparent plane image of the series of pixels. The electronic display system also comprises a computer operatively coupled to the borderless display module.

In some implementations, the borderless display module is one of a plurality of abutting borderless display modules, and the computer is configured to provide image data to each of the abutting borderless display modules, to present a continuous, unbroken display image extending across the plurality of borderless display modules.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic display comprising:
   a display matrix including a light-releasing surface and a series of pixels extending across a flat face portion and around a curved corner portion of the display matrix; and
   an image-correcting lens coupled to the light-releasing surface of the display matrix, the image-correcting lens having substantially constant thickness in a region arranged over the flat face portion and continuously varied thickness in a region arranged over the curved corner portion,
   the image-correcting lens being configured to transmit light released from the flat face portion and to reorient light released from the curved corner portion such that the transmitted light and the reoriented light exit the image-correcting layer substantially in parallel, forming an apparent plane image of the series of pixels.

2. The electronic display of claim 1 further comprising a luminance-correcting layer arranged between the display matrix and the image-correcting layer and configured to deflect the light released from the curved corner portion into an acceptance of the image-correcting layer.

3. The electronic display of claim 1 wherein the display matrix includes a flexible organic light-emitting diode matrix.

4. The electronic display of claim 1 wherein the image-correcting layer includes one or more prismatic and/or holographic films.

5. The electronic display of claim 1 wherein the image-correcting layer includes a refractive optic.

6. The electronic display of claim 1 wherein each of a thickness and a refractive index of the image-correcting layer, as functions of distance along the light-releasing surface, are controlled such that the transmitted light and the reoriented light exit the image-correcting layer substantially in parallel, forming the apparent plane image of the series of pixels.

7. The electronic display of claim 1 wherein the apparent plane image is substantially parallel to the flat face portion of the display matrix.

8. The electronic display of claim 1 wherein a spacing $\Delta S$ between the pixels in the image is functionally related to a spacing $\Delta A$ of the pixels in the series, wherein $\Delta S = c \times \Delta A$, and wherein c is a function of distance along the light-releasing surface.

9. The electronic display of claim 8 wherein the spacing between the pixels in the image is equal to the spacing between the pixels of the series.

10. The electronic display of claim 1 wherein the curved corner portion admits of a cylindrical curvature, and wherein a radius of the cylindrical curvature is one to five millimeters.

11. The electronic display of claim 1 wherein the image-correcting layer is comprised of hardened glass.

12. The electronic display of claim 1 further comprising a second flat face portion, wherein the curved corner portion is between the flat face portion and the second flat face portion, and wherein the series of pixels is viewable through both the flat face portion and the second flat face portion.

13. A display comprising:
a light-releasing display surface including first and second flat face portions and a curved corner portion between the first and second flat face portions; and
an image-correcting transparent polymer lens coupled to the light-releasing display surface and extending over the first flat face portion and around the curved corner portion, the image-correcting transparent polymer layer having a substantially constant thickness in a region arranged over the first flat face portion and a continuously varied thickness in a region arranged over the curved corner portion,
the image-correcting transparent polymer layer being configured to transmit light released from the first flat face portion and to reorient light released from the curved corner portion such that the transmitted light and the reoriented light exit the image-correcting transparent polymer layer substantially in parallel, forming an apparent plane image of the first flat face portion and the curved corner portion,
wherein the series of pixels is viewable through the first flat face portion and through the second flat face portion.

14. The display of claim 13 further comprising a luminance-correcting layer arranged between the light-releasing display surface and the image-correcting transparent polymer layer, wherein the luminance-correcting layer is configured to deflect the light released from the curved corner portion into an acceptance of the image-correcting transparent polymer layer.

15. The display of claim 14 wherein the luminance-correcting layer includes a prismatic layer.

16. The display of claim 14 wherein the luminance-correcting layer includes a holographic layer.

17. An electronic display system comprising:
a borderless display module comprising:
a display matrix including a light-releasing surface and a series of pixels extending across a flat face portion and around a curved corner portion of the display matrix; and
an image-correcting lens coupled to the light-releasing surface of the display matrix, the image-correcting lens having substantially constant thickness in a region arranged over the flat face portion and continuously varied thickness in a region arranged over the curved corner portion,
the image-correcting lens being configured to transmit light released from the flat face portion and to reorient light released from the curved corner portion such that the transmitted light and the reoriented light exit the image-correcting layer substantially in parallel, forming an apparent plane image of the series of pixels; and
a computer operatively coupled to the borderless display module.

18. The electronic display system of claim 17 wherein the borderless display module is one of a plurality of abutting borderless display modules, and wherein the computer is configured to provide image data to each of the abutting borderless display modules, to present a continuous, unbroken display image extending across the plurality of borderless display modules.

* * * * *